United States Patent [19]

Roberts

[11] 3,966,440

[45] June 29, 1976

[54] COLORIMETRIC VINYL CHLORIDE INDICATOR

[75] Inventor: Charles Clifton Roberts, Pittsburgh, Pa.

[73] Assignee: Catalyst Research Corporation, Baltimore, Md.

[22] Filed: June 3, 1975

[21] Appl. No.: 583,421

[52] U.S. Cl. .............................. 55/274; 55/DIG. 33; 55/DIG. 34; 116/114 AM; 252/408; 73/23; 23/254 R

[51] Int. Cl.² ......................................... B01D 46/30

[58] Field of Search ........ 55/274, DIG. 33, DIG. 34, 55/387; 116/114 AM, 114 AJ, DIG. 25; 252/408; 23/232 R, 254 R; 73/23; 128/146.2, 188

[56] References Cited
UNITED STATES PATENTS

| | | | |
|---|---|---|---|
| 1,537,519 | 5/1925 | Yablick | 55/DIG. 34 |
| 1,963,874 | 6/1934 | Stampe | 55/DIG. 33 |
| 2,210,862 | 8/1940 | Tronstad | 55/274 X |
| 3,047,993 | 8/1962 | Robbins | 55/274 |
| 3,350,175 | 10/1967 | Clay | 23/254 R |
| 3,455,656 | 7/1969 | Roberts et al. | 23/254 R |
| 3,684,456 | 8/1972 | McConnaughey | 23/254 R |

OTHER PUBLICATIONS

E. S. Gronsberg, Colorimetric Determination of Vinyl Chloride in Air, Chemical Abstracts, vol. 65, 1966, p. 17591.

Primary Examiner—Frank W. Lutter
Assistant Examiner—David L. Lacey
Attorney, Agent, or Firm—Reed Smith Shaw & McClay

[57] ABSTRACT

A colorimetric indicator for use in indicating the impending exhaustion of a vinyl organo filtering device. The colorimetric indicator material consists of activated alumina impregnated with between 0.5 to 5.0% by weight potassium permanganate and is positioned immediately behind a window in a canister or cartridge used in filtering vinyl organo materials.

3 Claims, 3 Drawing Figures

COLORIMETRIC VINYL CHLORIDE INDICATOR

FIELD OF THE INVENTION

The present invention relates to a colorimetric vinyl organo indicator for use in combination with a protective gas mask canister or respirator cartridge, and, in particular, a colorimetric indicator for detecting impending exhaustion of the protective capabilities of a canister or cartridge against vinyl chloride.

BACKGROUND OF THE INVENTION

The utililization of respirators or gas masks to protect against the inhalation of toxic gases is old and well known. Respirators or gas masks having a cartridge or canister filled with activated charcoal have been used to protect the wearer against the inhalation of gases such as vinyl chloride. While these devices provide excellent protection against toxic gases, their protective capabilities diminish with use and eventual permit the passage of gas therethrough unless the filtering material is replaced.

To warn the user of impending exhaustion of the protective capability of the canister or cartridge, various indicating means have been incorporated therein to provide a visual indication of the remaining life. See, for example, U.S. Pat. Nos. 1,537,519, 1,725,893, and 2,961,303. For the most part, the indicators are gas specific; that is, they are sensitive to only a limited number of specific compounds.

Because of recent findings regarding the carcinogenic nature of certain vinyl compounds, in particular vinyl chloride, and the very low threshold limit values of exposure, it is desirable to have available a means of warning of impending exhaustion of the protective capabilities of the respirator or gas mask cartridge or canister. Accordingly, it is an object of the present invention to provide a means for warning of impending canister or cartridge exhaustion. It is a further object of the present invention to provide a detection means that is both accurate and simple for the wearer of the respirator to use.

SUMMARY OF THE INVENTION

The present invention provides a colorimetric detector for indicating the impending exhaustion of the protective capability of a respirator or gas mask cartridge or canister. Generally, the present invention includes a conventional canister or cartridge having an indicator window mounted therein for visual viewing into the interior chamber. Preferably the window is positioned adjacent to the outlet end of the canister. A protective filtering medium, such as activated carbon, is positioned in the interior chamber, and in combination therewith, a colorimetric indicating material is positioned immediately behind the indicator window. The indicator material comprises activated alumina impregnated with between 0.5 and 5.0% by weight potassium permanganate.

Prior to exposure to vinyl organo compounds, the potassium permanganate has a purple color which can be seen through the indicator window of the canister. The potassium permanganate, however, changes in color from purple to brown in the presence of vinyl coumpounds, such as vinyl chloride. The rate of change in color is dependent upon the amount of vinyl chloride present. For example, when the material is exposed to 100% vinyl chloride monomer it changes color instantaneously and at 25 ppm it takes approximately 15 minutes. Accordingly, this material is useful as an indicator only in combination with the filtering medium in the canister. As the filtering medium loses its protective capabilities, the indicating material will change colors at rate dependent upon the loss of filtering activity to provide a warning well in advance of exhaustion.

Other advantages of the present invention will become apparent from a perusal of the following detailed description taken in connection with the accompanying drawings.

DETAILED DESCRIPTION OF THE INVENTION

Figure 1:
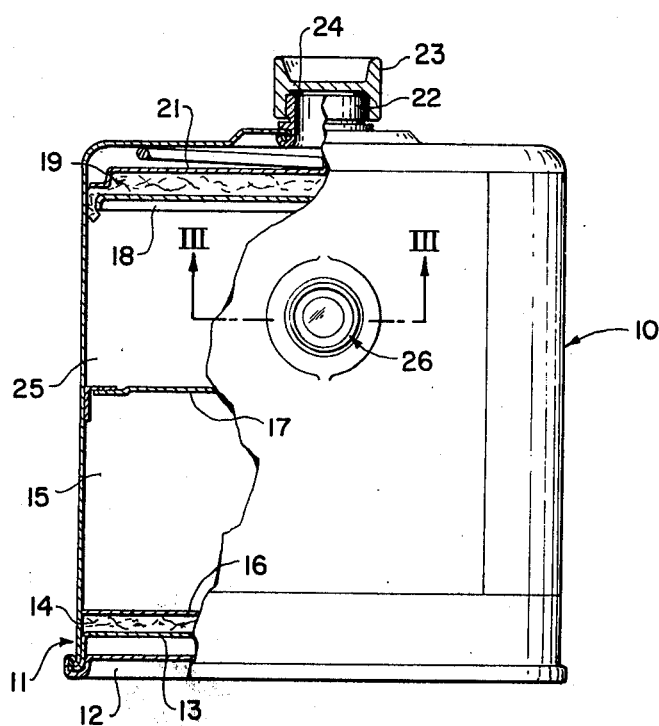
FIG. 1 is a front elevation, in partial section, of a standard activated charcoal canister.

With reference to FIG. 1, a conventional canister 10 for use with a respirator or gas mask is shown. Canister 10 includes a bottom portion 11 having an inlet valve 12 secured to the base of canister body 10. A spacer-filter member 13 is concentrically positioned and spaced apart from inlet valve 12 and provides support for glass fiber mat filter material 14.

Figure 2:
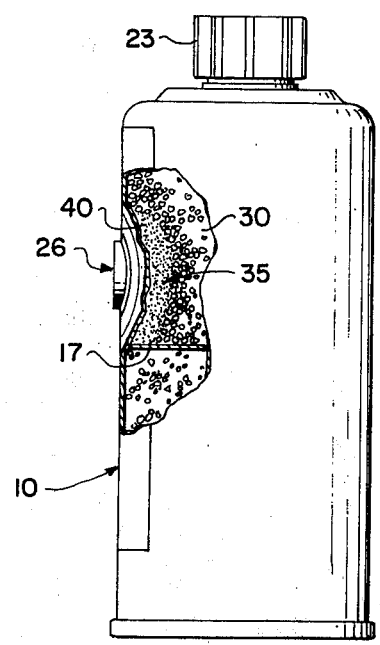
FIG. 2 is a side elevation of the canister shown in FIG. 1.

The top portion of canister 10 includes a connector member 22 which is the adapted to fit into the intake portion of a respirator or gas mask. As shown in FIGS. 1 and 2 a cap member 23 having gasket 24 is positioned over outlet connector 22. Cap 23 is removed prior to securing canister 10 to the inlet member of a gas mask, not shown.

Figure 3:
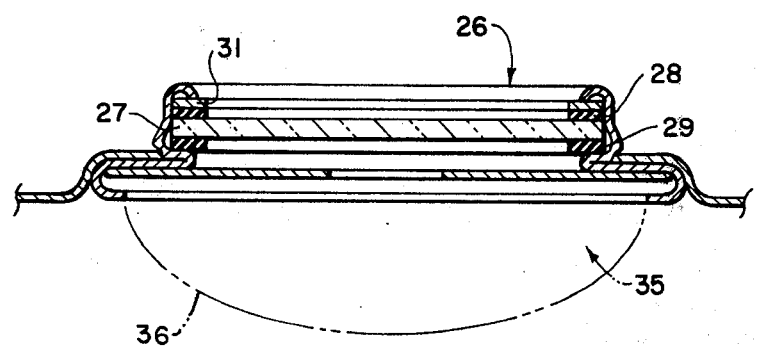
FIG. 3 is an enlarged view taken along line III—III of FIG. 1.

Canister 10 also includes an indicator window member 26 to provide visual access into second chamber 25. With reference to FIG. 3, indicator window 26 includes a glass disc 27 having inner and outer annular gaskets 28 and 29 secured by washer 31.

For use in filtering airborne vinyl chloride monomer, first and second chambers 15 and 25, respectively, are filled with granulated activated charcoal 30 as shown in FIG. 2. In accordance with the present invention, a pocket 35 in the activated charcoal 30, is positioned immediately behind window 26 and is filled with indicator material 40. Pocket 35 maybe defined by a perforated housing member 36 such as a molded Remay cup, a molded porous paper cup, a screen or like material through which the filter air may pass. Preferbly, the indicator material abuts indicator window 26.

The indicator material of the present invention comprises activated alumina impregnated with potassium permanganate. It has been found that potassium permanganate should be present in an amount of from 0.5% to 5.0% by weight. Generally, where the $KMnO_4$ is present in an amount less than 0.5% by weight, the color is too light to provide an adequate color gradation for effective visual warning in use. On the other hand, where the $KMnO_4$ is present in amounts greater than 5.0%, the color is too dark for adequate in use warning. Accordingly, it is preferred that the $KMnO_4$ be present in an amount of about 3.0% by weight.

Numerous methods can be used for depositing the permanganate on the activated alumina. For example, the activated alumina can be impregnated with a 5% aqueous solution of potassium permanganate and dried. Additionally, a commercially available material, Purafil, can be used. Purafil is manufactured by H. E. Burroughs and Associates, Inc. and comprises an activated alumina impregnated with about 3 to 5% potassium permanganate.

It has been found that the indicator material of the present invention changes from purple to brown upon exposure to vinyl chloride. The rate of color change is dependent upon the concentration of vinyl chloride to which the indicator material is exposed. For example, exposure to 100% vinyl chloride will cause an instantaneous change, whereas an exposure to an atmosphere of 25 ppm vinyl chloride requires 15 minutes.

In a presently perferred embodiment a canister containing a total of 1400 cc of activated charcoal in chambers 15 and 25. Indication window 26 was positioned approximately 5 cm from the top of canister 10. Pocket 35 positioned behind window 26 was filled with about 10–15 cc of activated alumna impregnated with potassium permanganate. The canister was tested against vinyl chloride monomer pursuant to NIOSH test conditions. That is, the canister was equilibrated for 6 hours at 85% R.H. and tested at 25 ppm vinyl chloride monomer, 64 lpm and 85% R.H. Canister 10 lasted 420 minutes to a leakage of 1ppm. The indicator during this test changed from purple to brown in the period 300 to 360 minutes.

Thus, by positioning the window and indicator material in chamber 25, the concentration required to change the color is correlated to the absorption capability of the charcoal or other filtering medium in chamber 15 downstream of the window. Because the window is not located at the top of the canister, the canister continues to provide protecive capabilities to assure that user has time to view the warning and replace the canister without being exposed to the dangerous gases.

While presently preferred embodiment of the invention has been shown and described, it may be otherwise embodied within the scope of the appended claims.

What is claimed is:

1. In a canister for removing airborne vinyl organo material from the atmosphere having an inlet and an outlet port and an inner chamber substantially filled with an active particulate material positioned between said inlet and outlet port for removing said airborne vinyl organo material and including an indicator window positioned for viewing into said inner chamber and adjacent to said outlet port, the improvement comprising a solid vinyl organo colorimetric indicating material positioned immediately behind said indicator window and extending into said active material, said vinyl organo colorimetric indicating material consisting of activated alumina impregnated with between 0.5 and 5.0% by weight potassium permanganate.

2. In a canister as set forth in claim 1 wherein said potassium permanganate is present in an amount of 3.0% by weight.

3. In a canister as set forth in claim 1 wherein said colorimetric indicating material is contained within a gas permeable container.

* * * * *

UNITED STATES PATENT OFFICE
CERTIFICATE OF CORRECTION

PATENT NO. : 3,966,440
DATED : 6/29/76
INVENTOR(S) : Charles Clifton Roberts

It is certified that error appears in the above-identified patent and that said Letters Patent are hereby corrected as shown below:

Page 1, item [73] "Assignee:" Change "Catalyst Research Corporation, Baltimore, Md." to read -- Mine Safety Appliances Co., Page 2, Summary of the Invention, Column 1, line 65 after "vinyl" delete "coumpounds" and substitute therefore -- compounds --

Page 2, column 2, line 6 after "at" and before "rate" add -- a --

Page 2, column 2, line 30, after "is" delete -- the --

Page 2, column 2, line 50, after "pass." delete "Preferbly" and substitute therefor -- Preferably --

Page 2, column 2, line 61, after "adequate" delete "in use" and substitute therefor -- use in --

Page 3, column 3, line 18, after "activated" delete "alumna" and substitute therefor -- alumina --

Page 3, colunm 4, line 2, after "provide" delete "protecive" and substitute therefor -- protective --

Signed and Sealed this

Fifteenth Day of March 1977

[SEAL]

Attest:

RUTH C. MASON
Attesting Officer

C. MARSHALL DANN
Commissioner of Patents and Trademarks